US012183529B2

(12) United States Patent
Minowa et al.

(10) Patent No.: US 12,183,529 B2
(45) Date of Patent: Dec. 31, 2024

(54) ELECTROMAGNETIC RELAY

(71) Applicant: OMRON Corporation, Kyoto (JP)

(72) Inventors: Ryota Minowa, Kyoto (JP); Naoki Kawaguchi, Kyoto (JP); Kohei Otsuka, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 94 days.

(21) Appl. No.: 18/011,191

(22) PCT Filed: Jun. 16, 2021

(86) PCT No.: PCT/JP2021/022803
§ 371 (c)(1),
(2) Date: Dec. 19, 2022

(87) PCT Pub. No.: WO2022/004378
PCT Pub. Date: Jan. 6, 2022

(65) Prior Publication Data

US 2023/0245845 A1 Aug. 3, 2023

(30) Foreign Application Priority Data

Jul. 2, 2020 (JP) ................................. 2020-114971

(51) Int. Cl.
*H01H 50/54* (2006.01)
*H01H 50/18* (2006.01)
*H01H 50/44* (2006.01)

(52) U.S. Cl.
CPC .......... *H01H 50/546* (2013.01); *H01H 50/18* (2013.01); *H01H 50/44* (2013.01)

(58) Field of Classification Search
CPC ............................. H01H 50/38; H01H 50/546
(Continued)

(56) References Cited

U.S. PATENT DOCUMENTS 5,546,061 A * 8/1996 Okabayashi ........... H01H 9/443 335/126
7,859,372 B2 * 12/2010 Ciocirlan ................. H01H 1/50 200/252
(Continued)

FOREIGN PATENT DOCUMENTS

JP 2012-142195 A 7/2012
JP 2016-31803 A 3/2016
(Continued)

OTHER PUBLICATIONS

A copy of the International Search Report of International Application No. PCT/JP2021/022803 issued on Aug. 31, 2021.
(Continued)

*Primary Examiner* — Alexander Talpalatski
(74) *Attorney, Agent, or Firm* — SHINJYU GLOBAL IP

(57) ABSTRACT

An electromagnetic relay includes a fixed terminal, a movable contact piece, a first contact, a second contact, a movable mechanism, and a magnet unit. The first contact is disposed on one of the fixed terminal or the movable contact piece. The second contact is disposed on another of the fixed terminal or the movable contact piece. The magnet unit generates a magnetic field to apply a Lorentz force to an arc generated between the first contact and the second contact. The magnet unit applies the Lorentz force in a first direction to the arc when a current flowing through the arc is directed from the second contact toward the first contact. In a state in which the first contact is in contact with the second contact, a center position of the first contact and a center position of the second contact are shifted from each other in the first direction.

4 Claims, 10 Drawing Sheets

(58) Field of Classification Search
USPC .......................................................... 335/201
See application file for complete search history.

(56) References Cited

U.S. PATENT DOCUMENTS

| | | | | |
|---|---|---|---|---|
| 8,674,796 | B2 * | 3/2014 | Ito ............................ | H01H 9/44<br>335/133 |
| 11,387,063 | B2 * | 7/2022 | Sakai ................... | H01H 50/546 |
| 2013/0214881 | A1 * | 8/2013 | Ito ............................ | H01H 9/44<br>335/127 |
| 2016/0027602 | A1 | 1/2016 | Hasegawa et al. | |
| 2016/0372286 | A1 | 12/2016 | Kubono et al. | |
| 2019/0013171 | A1 * | 1/2019 | Minowa ................. | H01H 50/44 |
| 2019/0035585 | A1 * | 1/2019 | Minowa ................. | H01H 50/56 |
| 2021/0304991 | A1 | 9/2021 | Otsuka et al. | |

FOREIGN PATENT DOCUMENTS

| | | | |
|---|---|---|---|
| JP | 2017-10719 | A | 1/2017 |
| JP | 2020-35561 | A | 3/2020 |

OTHER PUBLICATIONS

A copy of the Written Opinion of the International Searching Authority of International Application No. PCT/JP2021/022803 issued on Aug. 31, 2021.

* cited by examiner

ELECTROMAGNETIC RELAY

CROSS-REFERENCE TO RELATED APPLICATION

This application is the U.S. National Phase of International Application No. PCT/JP2021/022803, filed on Jun. 16, 2021. This application claims priority to Japanese Patent Application No. 2020-114971, filed Jul. 2, 2020. The contents of those applications are incorporated by reference herein in their entireties.

FIELD

The present invention relates to an electromagnetic relay.

BACKGROUND

An electromagnetic relay has been conventionally known that opens and closes an electrical circuit. For example, Japanese Unexamined Patent Application Publication No. 2012-142195 discloses an electromagnetic relay that includes a fixed terminal, a fixed contact on the fixed terminal, a movable contact piece, and a movable contact on the movable contact piece. The movable contact is configured to contact the fixed contact, and when the movable contact separates from or contacts the fixed contact, an electric circuit is opened or closed, respectively. The electromagnetic relay further includes a permanent magnet for extending an arc that occurs when the movable contact separates from the fixed contact.

SUMMARY

In the electromagnetic relay of Japanese Unexamined Patent Application Publication No. 2012-142195, when an arc occurs, the arc is likely to adhere to the ends of the fixed and movable contacts or the boundary between the contacts and terminal, which may hinder the transfer of the arc.

An object of the present invention is to quickly transfer an arc in an electromagnetic relay.

An electromagnetic relay according to one aspect of the present invention includes a fixed terminal, a movable contact piece, a first contact, a second contact, a movable mechanism, and a magnet unit. The first contact is disposed on one of the fixed terminal or the movable contact piece. The second contact is configured to contact the first contact and disposed on another of the fixed terminal or the movable contact piece. The movable mechanism is configured to move the movable contact piece between a closed position where the first contact is in contact with the second contact and an open position where the first contact is separated from the second contact. The magnet unit generates a magnetic field to apply a Lorentz force to an arc that occurs between the first contact and the second contact. The magnet unit applies the Lorentz force in a first direction to the arc when the current flowing through the arc is directed from the second contact toward the first contact. One of the first contact or the second contact protrudes in the first direction with respect to the other of the first contact or the second contact. A center position of the first contact and a center position of the second contact are shifted from each other in the first direction in a state in which the first contact is in contact with the second contact.

In the electromagnetic relay, for example, when the first contact protrudes in the first direction with respect to the second contact, one end of the first contact lies beyond one end of the second contact in the first direction. Thus, the end of an arc on the first-contact side is offset in the first direction from the end of an arc on the second-contact side. Accordingly, the direction of the Lorentz force acting on the arc changes, facilitating the end of the arc on the second-contact side to transfer to the terminal where the second contact is positioned (one of the fixed terminal and the movable contact piece). That is, the direction of the Lorentz force acting on the arc changes, and thereby it is possible to cause the end of the arc on the second-contact side to quickly transfer to the terminal where the second contact is disposed. As a result, the arc can be quickly transferred in the first direction.

The first contact may protrude in the first direction with respect to the second contact. In this case, when the current flowing through the arc is directed from the second contact toward the first contact, the Lorentz force acts in the direction in which the end of the arc on the second contact is transferred to the terminal: the end of the arc on the second contact that provides an anode-side contact is transferred more easily than that on the first contact that provides a cathode-side contact. As a result, one of the ends of the arc can be transferred to the terminal more effectively, enhancing the quick transfer of the arc.

The second contact may protrude in the second direction opposite to the first direction more than the first contact. The magnet unit may apply the Lorentz force in second direction to the arc when the current flowing through the arc is directed from the first contact toward the second contact. In this case, it is possible to cause the end of the arc to be quickly transferred to the terminal where one of the first and second contacts is disposed to provide an anode-side contact, regardless of the direction of the current flow.

In a state in which the first contact is separated from the second contact, the center position of the first contact and the center position of the second contact may be shifted each other in the first direction. In this case, also, the arc can be quickly transferred in the first direction.

DETAILED DESCRIPTION

Figure 1:
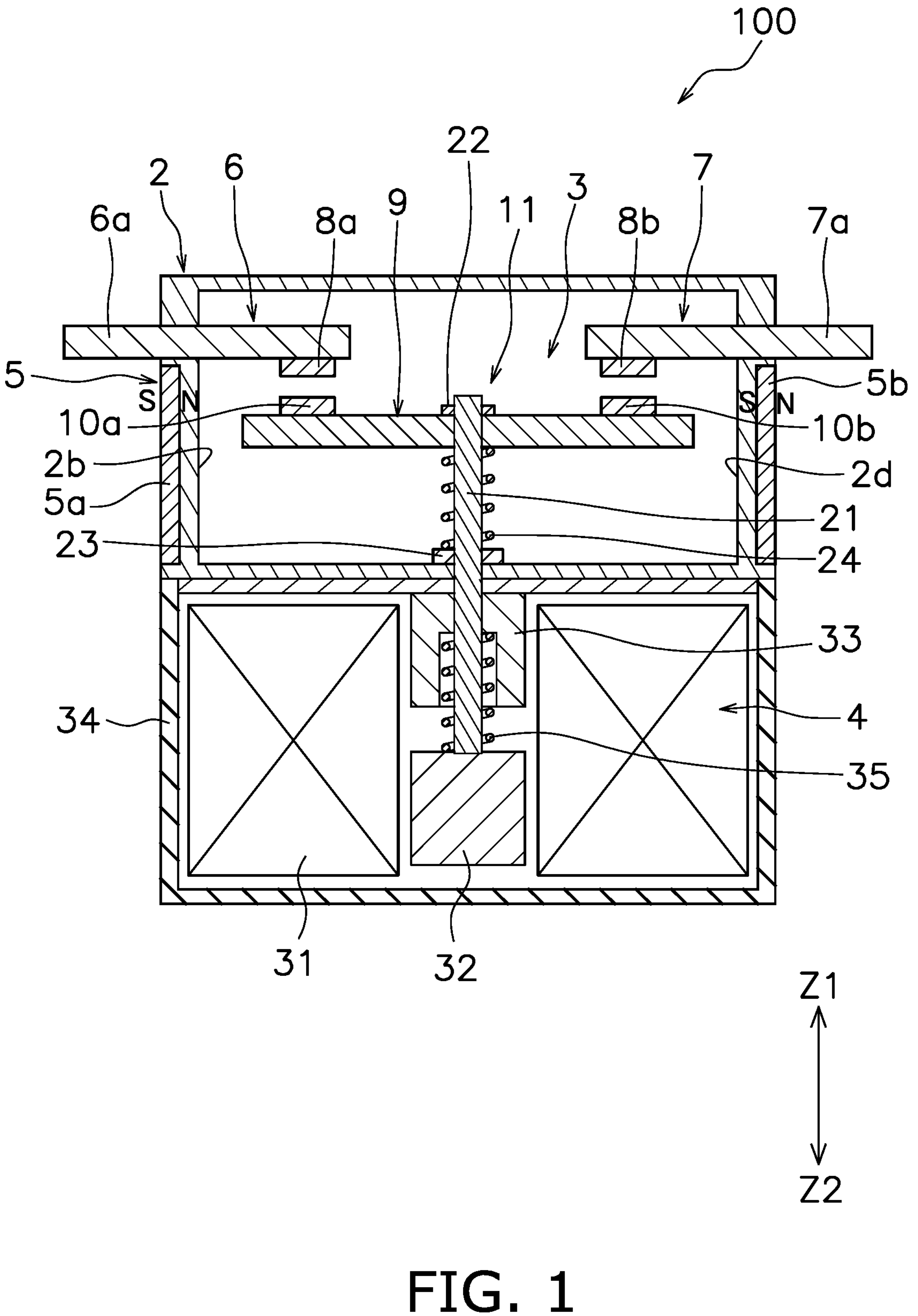
FIG. 1 is a schematic cross-sectional view of an electromagnetic relay.

Hereinafter, an electromagnetic relay of an embodiment according to an aspect of the presentation will be described with reference to the drawings. When referring to the drawings, the upper side in FIG. 1 is referred to as "up", the lower side as "down", the left side as "left", and the right side as "right" for the brevity of description. Also, the direction orthogonal to the plane of FIG. 1 is defined as the front-rear direction. However, these directions are defined for the convenience of description and are not intended to limit the directions of arrangements of an electromagnetic relay 100.

Figure 2:
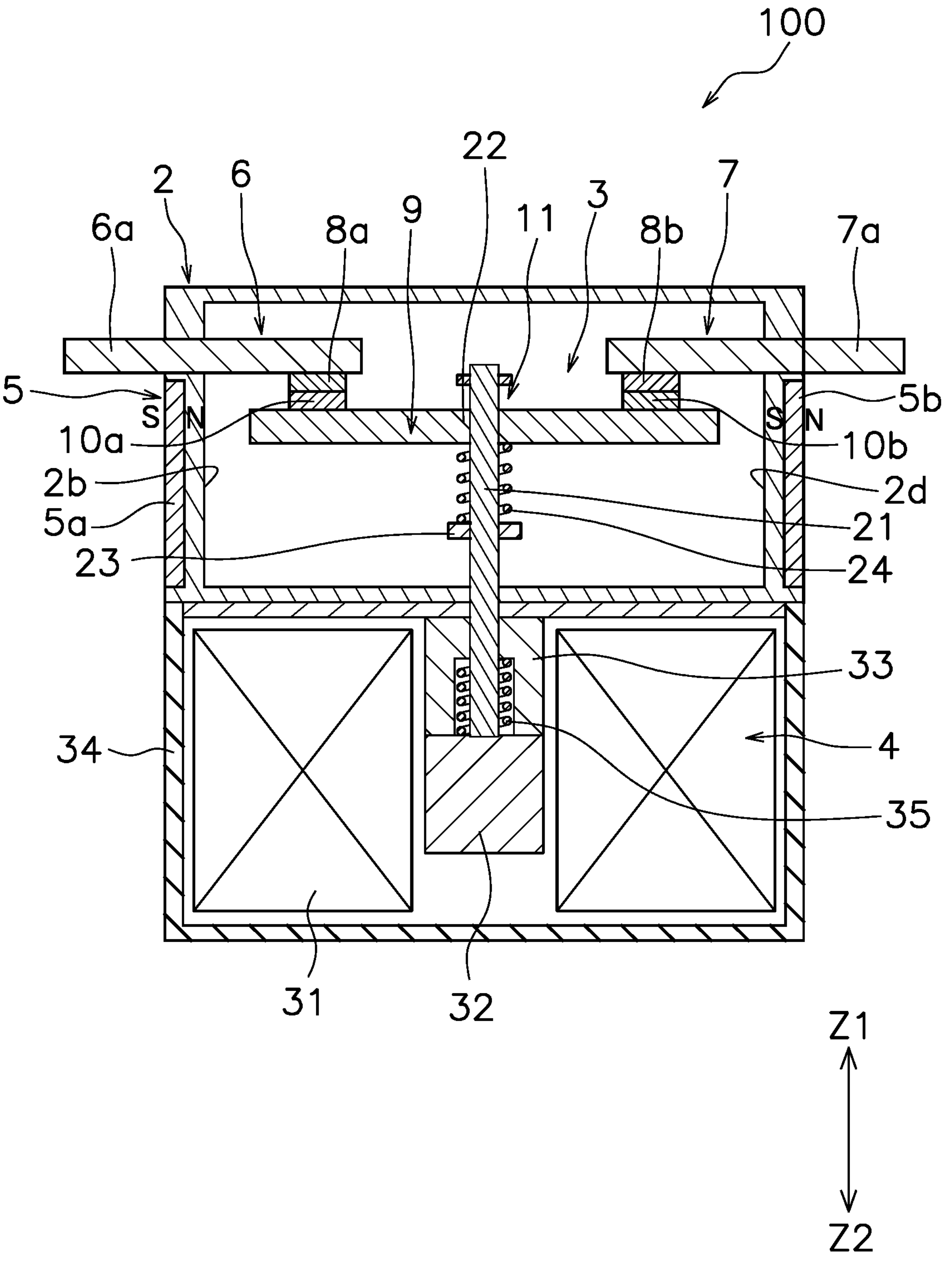
FIG. 2 is a schematic cross-sectional view of the electromagnetic relay.

FIGS. 1 and 2 are each a schematic cross-sectional view of the electromagnetic relay 100. The electromagnetic relay 100 includes a contact case 2, a contact device 3, a drive device 4, and a magnet unit 5.

The contact case 2 has a substantially rectangular box shape and is comprised of insulating material. In the present embodiment, the contact case 2 is comprised of resin. The contact case 2 accommodates the contact device 3.

Figure 3:
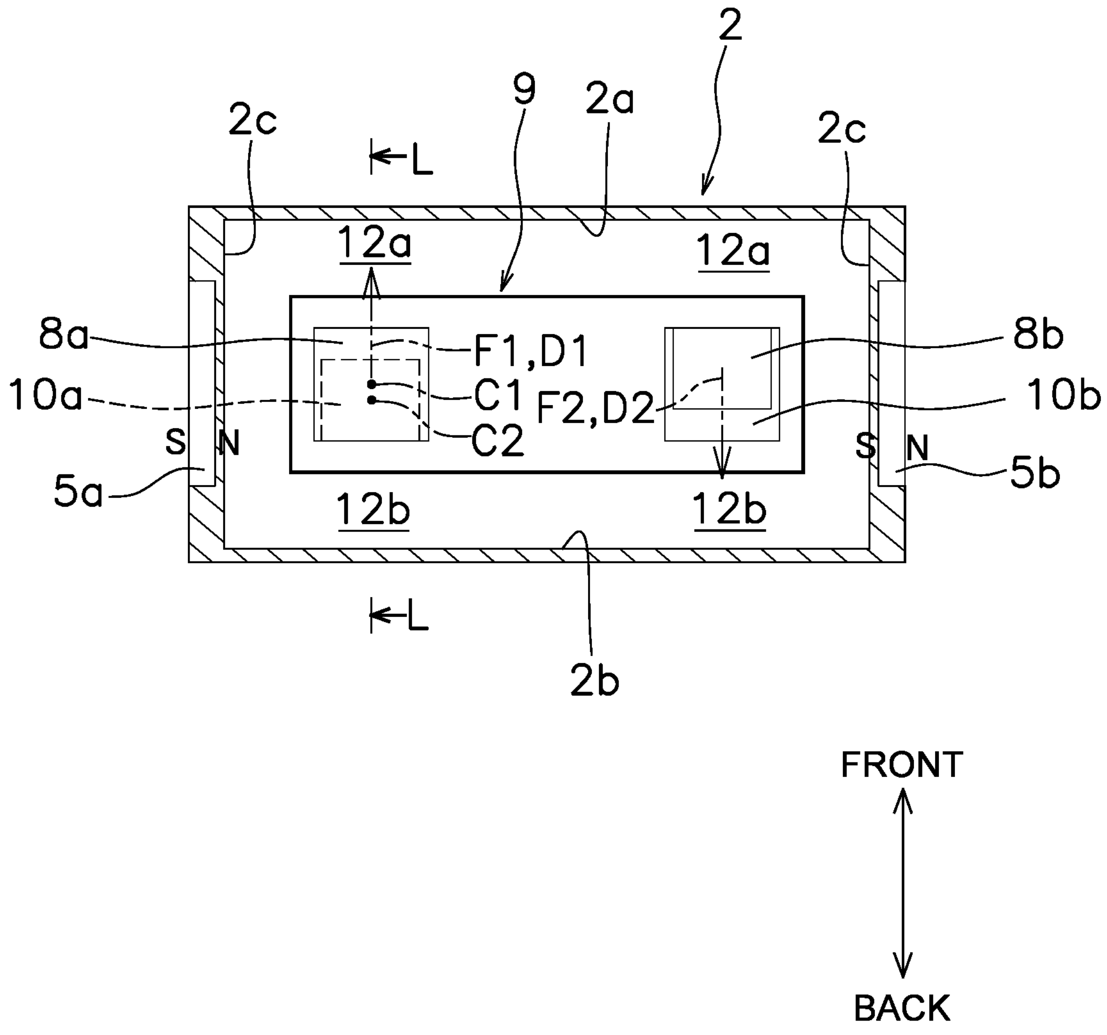
FIG. 3 is a schematic diagram of the inside of a contact case, viewed from above.

FIG. 3 is a schematic diagram of the inside of the contact case 2, viewed from above. The contact case 2 includes first to fourth inner surfaces 2*a* to 2*d*. The first to fourth inner surfaces 2*a* to 2*d* are the inner surfaces of the contact case 2, respectively, on the front, rear, left, and right sides. The first inner surface 2*a* and the second inner surface 2*b* are disposed facing each other in the front-rear direction. The first inner surface 2*a* and the second inner surface 2*b* extend in the up-down direction and the left-right direction. The third inner surface 2*c* and the fourth inner surface 2*d* are disposed to face each other in the left-right direction. The third inner surface 2*c* and the fourth inner surface 2*d* extend in the up-down direction and the front-rear direction.

The contact device 3 includes fixed terminals 6 and 7, fixed contacts 8*a* and 8*b*, a movable contact piece 9, movable contacts 10*a* and 10*b*, and a movable mechanism 11. The fixed terminals 6 and 7, the fixed contacts 8*a* and 8*b*, the movable contact piece 9, and the movable contacts 10*a* and 10*b* are comprised of conductive material. The fixed contact 8*a* and the movable contact 10*b* in the present embodiment are examples of the first contact, and the fixed contact 8*b* and movable contact 10*a* in the present embodiment are examples of the second contact.

The fixed terminals 6 and 7 are plate-shaped terminals and extend in the left-right direction. The fixed terminals 6 and 7 are disposed to be separated from each other in the left-right direction. The fixed terminal 6 includes an external connection 6*a* projecting leftward from the contact case 2. The fixed terminal 7 includes an external connection 7*a* projecting rightward from the contact case 2.

The fixed contacts 8*a* and 8*b* are disposed inside the contact case 2. The fixed contacts 8*a* and 8*b* are substantially rectangular when viewed in the up-down direction. The fixed contacts 8*a* and 8*b* may have chamfered ends. The fixed contact 8*a* is disposed on the fixed terminal 6. The fixed contact 8*a* protrudes, toward the movable contact piece 9, from the surface of the fixed terminal 6 facing the movable contact piece 9. Here, the fixed contact 8*a* protrudes downward from the fixed terminal 6. The fixed contact 8*b* is disposed on the fixed terminal 7. The fixed contact 8*b* protrudes, toward the movable contact piece 9, from the surface of the fixed terminal 7 facing the movable contact piece 9.

The movable contact piece 9 is a plate-like member elongated in one direction and extends in the left-right direction within the contact case 2. In the present embodiment, the longitudinal direction of the movable contact piece 9 corresponds to the left-right direction. Also, the lateral direction of the movable contact piece 9 corresponds to the front-rear direction. The movable contact piece 9 moves integrally with the movable contacts 10*a* and 10*b*. The movable contact piece 9 is disposed to be separated from the first inner surface 2*a* and the second inner surface 2*b* in the front-rear direction. Between the movable contact piece 9 and the first inner surface 2*a* and between the movable contact piece 9 and the second inner surface 2*b*, extension spaces 12*a* and 12*b* are defined for extending an arc, respectively.

The movable contacts 10*a* and 10*b* are disposed on the movable contact piece 9. The movable contacts 10*a* and 10*b* are substantially rectangular when viewed in the up-down direction. The movable contacts 10*a* and 10*b* may have chamfered ends. The movable contacts 10*a* and 10*b* are movable between a closed position (the position shown in FIG. 1) to be in contact with the fixed contacts 8*a* and 8*b* and an open position (the position shown in FIG. 2) to be separated from the fixed contacts 8*a* and 8*b*. The movable contacts 10*a* and 10*b* are movable in a contact direction Z1 to contact the fixed contacts 8*a* and 8*b* and in a separation direction Z2 to be separated from them. In the present embodiment, the contact direction Z1 and the separation direction Z2 correspond to the up-down direction.

The movable contact 10*a* is at a position facing the fixed contact 8*a* and protrudes from the movable contact piece 9 toward the fixed contact 8*a*. The movable contact 10*b* is at a position facing the fixed contact 8*b* and protrudes from the movable contact piece 9 toward the fixed contact 8*b*.

The movable mechanism 11 moves the movable contact piece 9 between the closed position shown in FIG. 1 and the open position shown in FIG. 2. The movable mechanism 11 moves the movable contacts 10*a* and 10*b* via the movable contact piece 9. The movable mechanism 11 includes a drive shaft 21, a first holding member 22, a second holding member 23, and a contact spring 24. The drive shaft 21 is coupled to the movable contact piece 9. The drive shaft 21 extends in the up-down direction and passes through the movable contact piece 9 in the up-down direction. The drive shaft 21 is set to be movable in the contact direction Z1 and the separation direction Z2.

The first holding member 22 is fixed to the drive shaft 21 above the movable contact piece 9. The second holding member 23 is fixed to the drive shaft 21 below the movable contact piece 9. The contact spring 24 is disposed between the movable contact piece 9 and the second holding member 23. The contact spring 24 urges the movable contact piece 9 in the contact direction Z1 via the second holding member 23.

The drive device 4 moves the movable mechanism 11 by electromagnetic force in the contact direction Z1 and the separation direction Z2. In the present embodiment, the drive device 4 moves the movable contact piece 9 in the contact direction Z1 and the separation direction Z2 via the drive shaft 21. The drive device 4 includes a coil 31, a movable iron core 32, a fixed iron core 33, a yoke 34, and a return spring 35.

Upon application of a voltage to the coil 31 for excitation, the coil 31 generates an electromagnetic force to move the movable iron core 32 in the contact direction Z1. The movable iron core 32 is coupled to the drive shaft 21 so as to be movable together. The fixed iron core 33 is at a position facing the movable iron core 32. The yoke 34 is set to surround the coil 31. The return spring 35 is disposed between the movable iron core 32 and the fixed iron core 33. The return spring 35 urges the movable iron core 32 in the separation direction Z2.

The magnet unit 5 generates a magnetic field to apply Lorentz forces F1 and F2 to the arcs that are generated between the fixed contact 8*a* and the movable contact 10*a* and between the fixed contact 8*b* and the movable contact 10*b*. The magnet unit 5 is disposed such that the Lorentz force F1 acts, in the first direction D1, on an arc occurring between the fixed contact 8*a* and the movable contact 10*a* when the current flowing through the arc is directed from the movable contact 10*a* to the fixed contact 8*a* (from the rear to the front of the paper surface of FIG. 3). That is, the first direction D1 is the direction in which the arc that occurs between the fixed contact 8*a* and the movable contact 10*a* is extended. However, in the present embodiment, the direction of the Lorentz force F1 acting on the arc changes as the arc is transferred. As such, more precisely, the first direction D1 means the direction of the Lorentz force F1 acting on the arc at the point of time when the arc occurs between the fixed contact 8*a* and the movable contact 10*a*. The first direction D1 in the present embodiment is forward. The first direction D1 is parallel to the lateral direction of the movable contact piece 9 and is the direction from the movable contact piece 9 toward the first inner surface 2*a*.

The magnet unit 5 includes a first magnet 5*a* and a second magnet 5*b*. The first magnet 5*a* and the second magnet 5*b* are permanent magnets. The first magnet 5*a* and the second magnet 5*b* are substantially rectangular and extend in the front-rear direction and the up-down direction. The first magnet 5*a* is disposed on the outer periphery of the contact case 2 below the fixed terminal 6. The second magnet 5*b* is disposed on the outer periphery of the contact case 2 below the fixed terminal 7. The first magnet 5*a* is positioned to face the second magnet 5*b* in the left-right direction. The first magnet 5*a* and the second magnet 5*b* are disposed such that their opposite poles face each other in the longitudinal direction of the movable contact piece 9. The first magnet 5*a* is placed with its N pole facing the contact case 2. The second magnet 5*b* is placed with its S pole facing the contact case 2.

The first magnet 5*a* and the second magnet 5*b* disposed as described above produce magnetic flux in the direction from the first magnet 5*a* toward the second magnet 5*b*. That is, around the fixed contacts 8*a* and 8*b* and the movable contacts 10*a* and 10*b*, the magnetic flux flows in a direction substantially parallel to the longitudinal direction of the movable contact piece 9. Thus, for example, when a current flows from the movable contact 10*a* toward the fixed contact 8*a*, the Lorentz force F1 acts on the arc occurring between the fixed contact 8*a* and the movable contact 10*a*, and the arc is transferred to the arc extension space 12*a*. In contrast, on the arc occurring between the fixed contact 8*b* and the movable contact 10*b*, the Lorentz force F2 acts in the second direction D2 opposite to the first direction D1. That is, the arc that occurs between the fixed contact 8*b* and the movable contact 10*b* is subjected to the Lorentz force F2 acting in the direction toward the second inner surface 2*b*, and the arc is transferred to the arc extension space 12*b*. In the present embodiment, unless otherwise specified, the direction in which a current flow is assumed to be the direction from the movable contact 10*a* toward the fixed contact 8*a*. As such, on the movable contact 10*b* side, a current flows in the direction from the fixed contact 8*b* toward the movable contact 10*b*.

Next, the operations of the electromagnetic relay 100 will be described. While the drive device 4 is not excited, the movable contacts 10*a* and 10*b* are in the open position as shown in FIG. 1. As shown in FIG. 2, when the drive device 4 is excited, the movable contacts 10*a* and 10*b* move from the open position to the closed position. Specifically, when a voltage is applied to the coil 31, the movable iron core 32 moves in the contact direction Z1 against the elastic force of the return spring 35. As the movable iron core 32 moves in the contact direction Z1, the drive shaft 21 and the movable contact piece 9 move in the contact direction Z1, moving the movable contacts 10*a* and 10*b* to the closed positions to come into contact with the fixed contacts 8*a* and 8*b*. When the application of voltage to the coil 31 is stopped, the movable iron core 32 moves in the separation direction Z2 together with the movable contact piece 9 according to the elastic force of the return spring 35, moving the movable contacts 10*a* and 10*b* to the open position.

Figure 4:
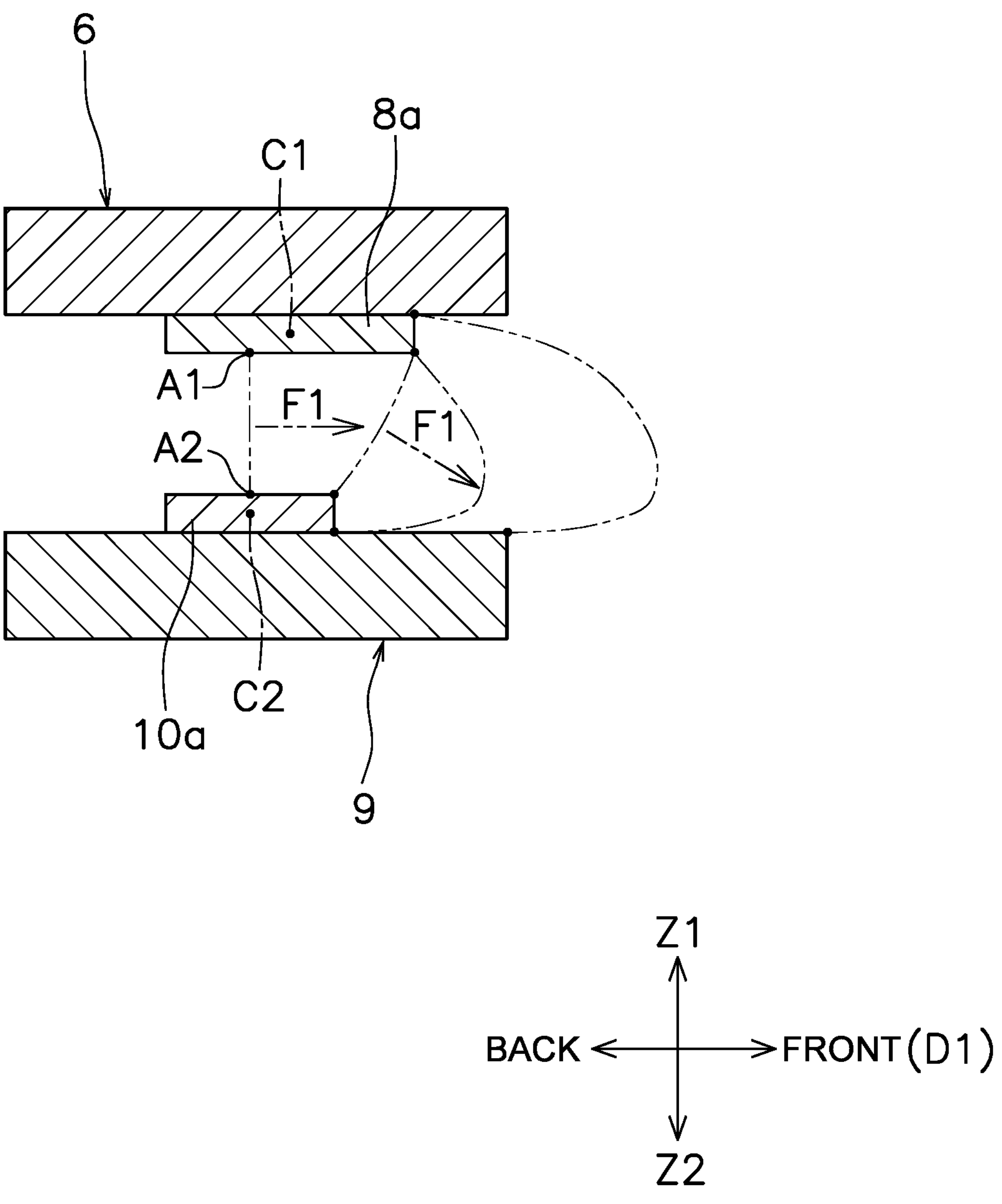
FIG. 4 is a schematic cross-sectional view of and around a movable contact when the movable contact is in an open position, taken along the line L-L in FIG. 3.
Figure 5:
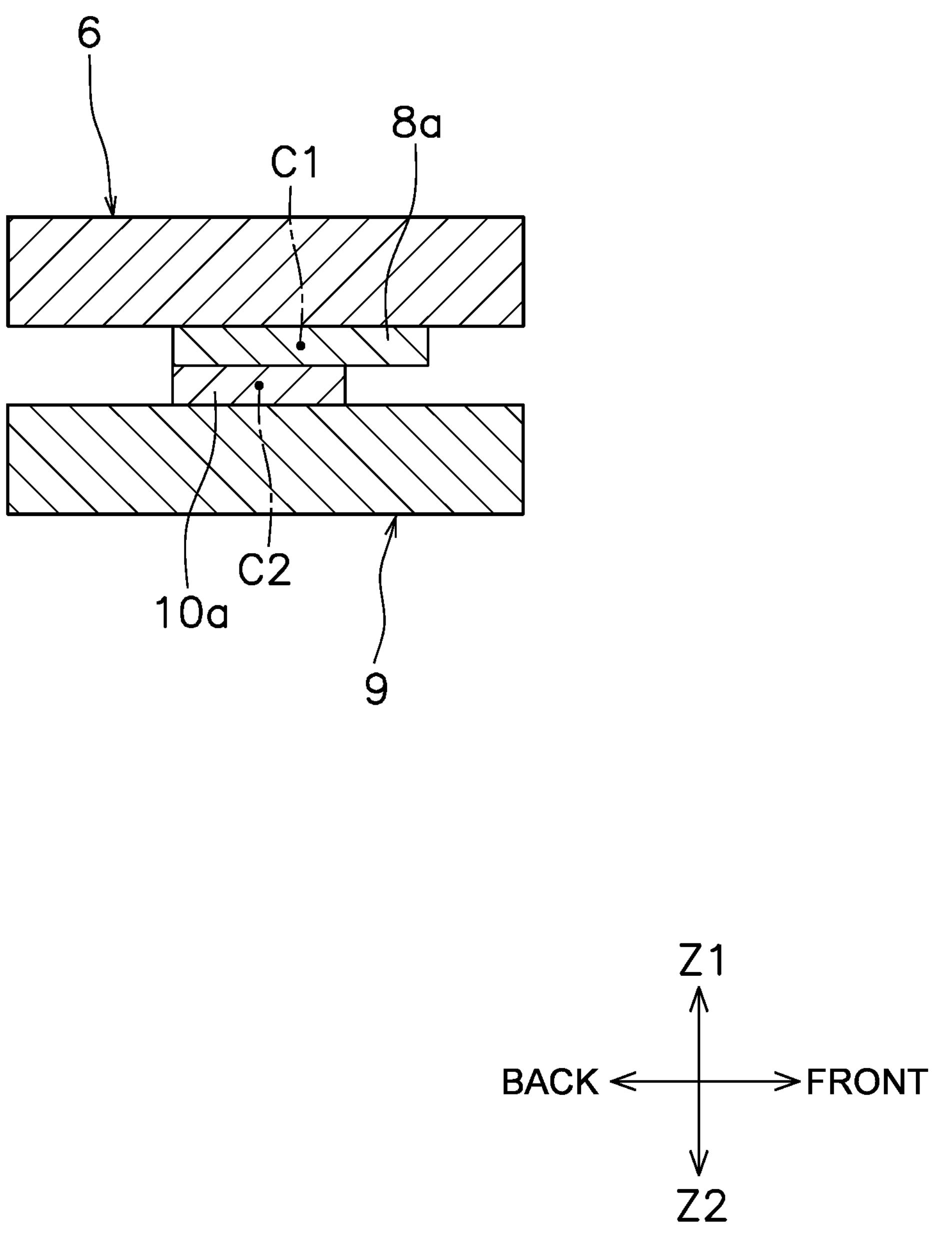
FIG. 5 is a schematic cross-sectional view of and around the movable contact when the movable contact is in a closed position, taken along the line L-L in FIG. 3.

Next, the fixed contact 8*a* and the movable contact 10*a* will be described in detail. FIG. 4 is a schematic cross-sectional view of and around the movable contact 10*a* when the movable contact 10*a* is in the open position, taken along the line L-L in FIG. 3. FIG. 4 schematically shows how the arc occurring between the fixed contact 8*a* and the movable contact 10*a* is extended. FIG. 5 is a schematic cross-sectional view of and around the movable contact 10*a* when the movable contact 10*a* is in the closed position, taken along the line L-L in FIG. 3.

The fixed contact 8*a* protrudes in the first direction D1 (here, forward) more than the movable contact 10*a*. The movable contact 10*a* is shorter than the fixed contact 8*a* in the first direction D1. The fixed contact 8*a* is out of alignment with the movable contact 10*a* in the first direction D1. That is, the fixed contact 8*a* is out of alignment with the movable contact 10*a* in the direction in which an arc is extended (the same direction as that of the Lorentz force F1).

As shown in FIGS. 4 and 5, in the state where the fixed contact 8*a* is in contact with the movable contact 10*a* and in the state where the fixed contact 8*a* is separated from the movable contact 10*a*, the center position C1 of the fixed contact 8*a* is out of alignment with the center position C2 of the movable contact 10*a* in the first direction D1. The center position C1 of the fixed contact 8*a* is located at the center of the fixed contact 8*a* in the front-rear direction. The center position C2 of the movable contact 10*a* is located at the center of the movable contact 10*a* in the front-rear direction. As shown in FIG. 3, when viewed from the moving direction of the movable contact 10*a*, the center position C1 of the fixed contact 8*a* and the center position C2 of the movable contact 10*a* are offset from each other in the first direction D1. That is, the center position C1 of the fixed contact 8*a* does not overlap the center position C2 of the movable contact 10*a* in the up-down direction. In the present embodiment, the center position C1 of the fixed contact 8*a* is out of alignment with the center position C2 of the movable contact 10*a* in the first direction D1.

As shown in FIG. 4, when the Lorentz force F1 acts on the arc that occurs between the fixed contact 8*a* and the movable contact 10*a*, the first end A1 of the arc on the fixed contact 8*a* side and the second end A2 of the arc on the movable contact 10*a* side are transferred in the direction toward the inner surface 2*a*. At this point of time, since the fixed contact 8*a* is out of alignment with the movable contact 10*a* in the first direction D1 in which the arc is extended, the first end A1 of the arc is transferred toward the first inner surface 2*a* more than the second end A2 of the arc. Accordingly, the first end A1 of the arc gets offset from the second end A2 of the arc in the up-down direction, and thereby the Lorentz force F1 acting on the arc is directed forward and toward the separation direction Z2. That is, the Lorentz force F1 acts in the direction which facilitates the transfer of the second end A2 of the arc from the movable contact 10*a* to the movable contact piece 9, allowing the second end A2 of the arc to be quickly transferred to the movable contact piece 9. As such, the arc can be quickly transferred in the first direction D1.

Here, an arc that occurs between the fixed contact 8*a* and the movable contact 10*a* is likely to adhere to the ends of the fixed contact 8*a* and the ends of the movable contact 10*a*. Also, the arc on a cathode-side contact tends to be movable more than that on an anode-side contact. The anode-side contact and the cathode-side contact are determined by the direction of a current flow. Specifically, regarding the fixed contact 8*a* and the movable contact 10*a*, the contact upstream in the direction of the current flow is defined as an anode-side contact, and the contact downstream is defined as a cathode-side contact. Thus, when a current flows from the movable contact 10*a* toward the fixed contact 8*a*, the movable contact 10*a* provides an anode-side contact, and the fixed contact 8*a* provides a cathode-side contact. In the present embodiment, the Lorentz force F1 acts in the direction in which the second end A2 of the arc is transferred to the movable contact piece 9: the second end A2 of the arc on the movable contact 10*a* side can be transferred more easily than the first end A1 of the arc on the fixed contact 8*a* side. As a result, the end of the arc can be transferred to the movable contact piece 9 more effectively, enhancing the quick transfer of the arc.

Note that, in the case of the movable contact 10*b*, as shown in FIG. 3, the movable contact 10*b* that provides a cathode-side contact is preferably out of alignment, in the second direction D2, with the fixed contact 8*b* that provides an anode-side contact. With the configuration, the same effect as that of the movable contact 10*a* can be obtained.

One embodiment of the electromagnetic relay according to one aspect of the present invention has been described above, but the present invention is not limited to the above embodiment, and various modifications are possible without departing from the gist of the invention. For example, the shapes or arrangements of the contact case 2, the contact device 3, and the drive device 4 may be changed. In the above embodiment, the present invention has been described by exemplifying a plunger-type electromagnetic relay, but the present invention may be applied to, for example, a hinge-type electromagnetic relay. In the case of a hinge-type electromagnetic relay, the structures corresponding to the fixed terminal 7, the fixed contact 8*b*, and the movable contact 10*b* may be omitted. In addition, the present invention may be applied to an electromagnetic relay in which the movable contact piece 9 moves to be pulled toward the fixed terminals 6 and 7.

In the above embodiment, the fixed contact 8*a* protrudes in the first direction D1 more than the movable contact 10*a*, but the movable contact 10*a* may protrude in the first direction D1 more than the fixed contact 8*a*. That is, the fixed contact 8*a* may have the shape of the movable contact 10*a* in the above embodiment, and the movable contact 10*a* may have the shape of the fixed contact 8*a* in the above embodiment. In this case, the movable contact 10*a* is an example of the first contact, the fixed contact 8*a* is an example of the second contact, and then the first end A1 of the arc can be quickly transferred to the fixed terminal 6 by the Lorentz force F1.

Figure 6:
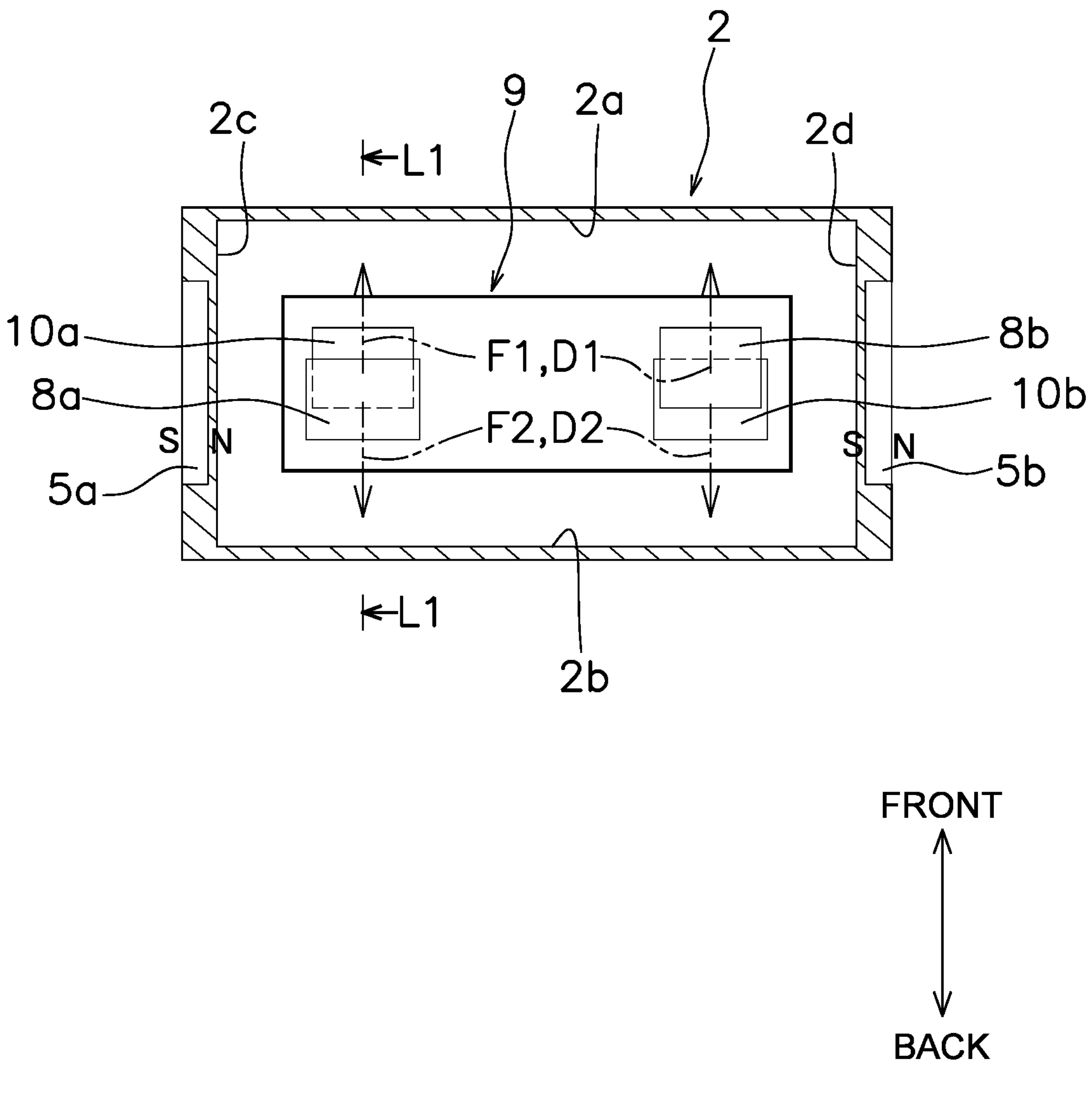
FIG. 6 is a schematic view of the inside of a contact case according to another embodiment, viewed from above.
Figure 7:
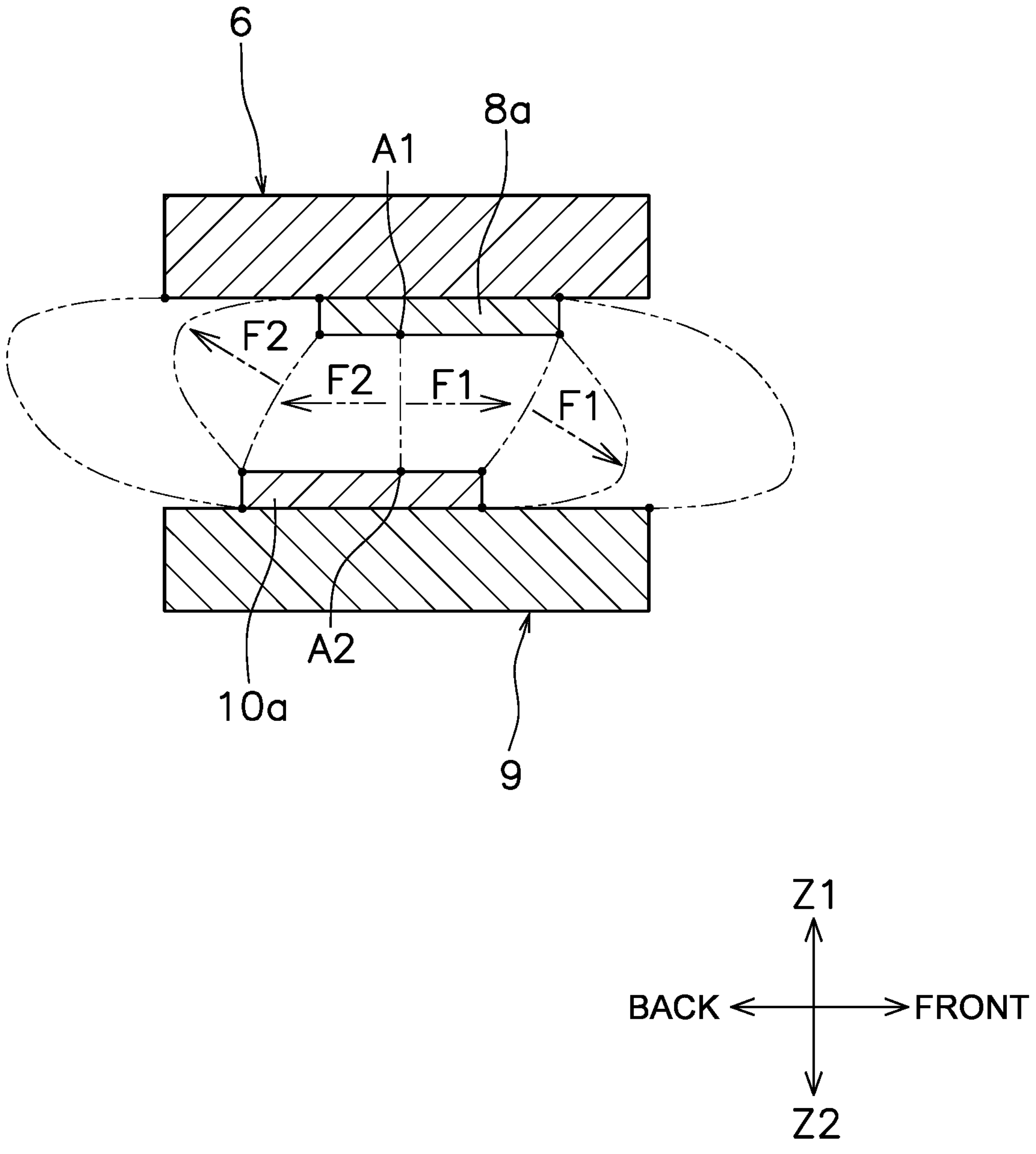
FIG. 7 is a schematic cross-sectional view of and around a movable contact when the movable contact is in an open position, taken along the line L1-L1 in FIG. 6.

FIG. 6 is a schematic view of the inside of a contact case 2 according to another embodiment, viewed from above. FIG. 7 is a schematic cross-sectional view of and around the movable contact 10*a* when the movable contact 10*a* is in the open position, taken along the line L1-L1 in FIG. 6. As shown in FIGS. 6 and 7, the movable contact 10*a* may protrude in the second direction D2 more than the fixed contact 8*a*. Note that, as in the above embodiment, the fixed contact 8*a* protrudes in the first direction D1 more than the movable contact 10*a*. The magnet unit 5 is disposed such that, when the current flowing through the arc is directed from the fixed contact 8*a* to the movable contact 10*a* (from the front to the rear of the paper surface of FIG. 6), the Lorentz force F2 acts in the second direction D2 onto the arc that occurs between the fixed contact 8*a* and the movable contact 10*a*. The configuration of the magnet unit 5 is the same as that of the above embodiment. In this case, when the current flowing through the arc is directed from the fixed contact 8*a* toward the movable contact 10*a*, the Lorentz force F2 acts in the direction in which the first end A1 of the arc on the fixed contact 8*a* providing an anode side contact is transferred to the fixed terminal 6. That is, even when the direction of the current flow changes, the end of the arc can be quickly transferred to the fixed terminal 6 or the movable contact piece 9 which has the fixed contact 8*a* or the movable contact 10*a*, wherein the fixed contact 8*a* or the movable contact 10*a* provides an anode side contact.

As for the movable contact 10*b* side, preferably the fixed contact 8*b* is out of alignment with the movable contact 10*b* in the first direction D1. With the configuration, the same effect as that on the movable contact 10*a* side can be obtained on the movable contact 10*b* side.

Figure 8:
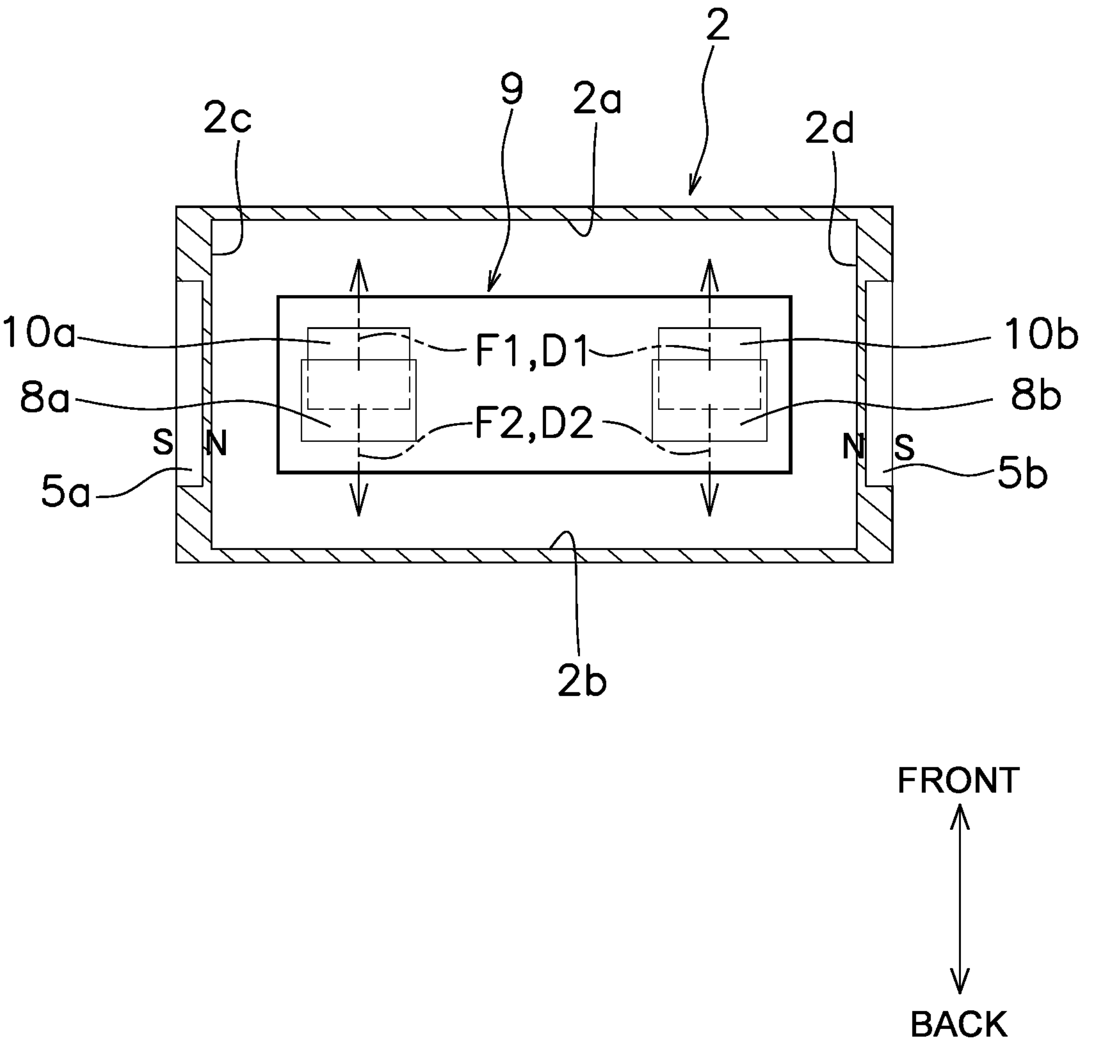
FIG. 8 is a schematic view of the inside of a contact case according to another embodiment, viewed from above.

The configuration of the magnet unit 5 is not limited to the above embodiment. For example, as shown in FIG. 8, the first magnet 5*a* and the second magnet 5*b* may be disposed such that their north poles face each other in the longitudinal direction of the movable contact piece 9. That is, the magnet unit 5 may be configured such that magnetic flux flows around the fixed contact 8*a* and the movable contact 10*a* in the direction from the first magnet 5*a* toward the second magnet 5*b* and also magnetic flux flows around the fixed contact 8*b* and the movable contact 10*b* in the direction from the second magnet 5*b* toward the first magnet 5*a*. The fixed contact 8*a* and the movable contact 10*a* have the same configurations as those shown in FIG. 6. The fixed contact 8*b* and the movable contact 10*b* have the same configuration as the fixed contact 8*a* and the movable contact 10*b*. In this case, even when the current direction changes, the anode-side contact is invariably shorter, both on the movable contact 10*a* side and the movable contact 10*b* side, than the cathode-side contact in the direction of arc extension. As a result, the end of the arc can be quickly transferred.

Figure 9:
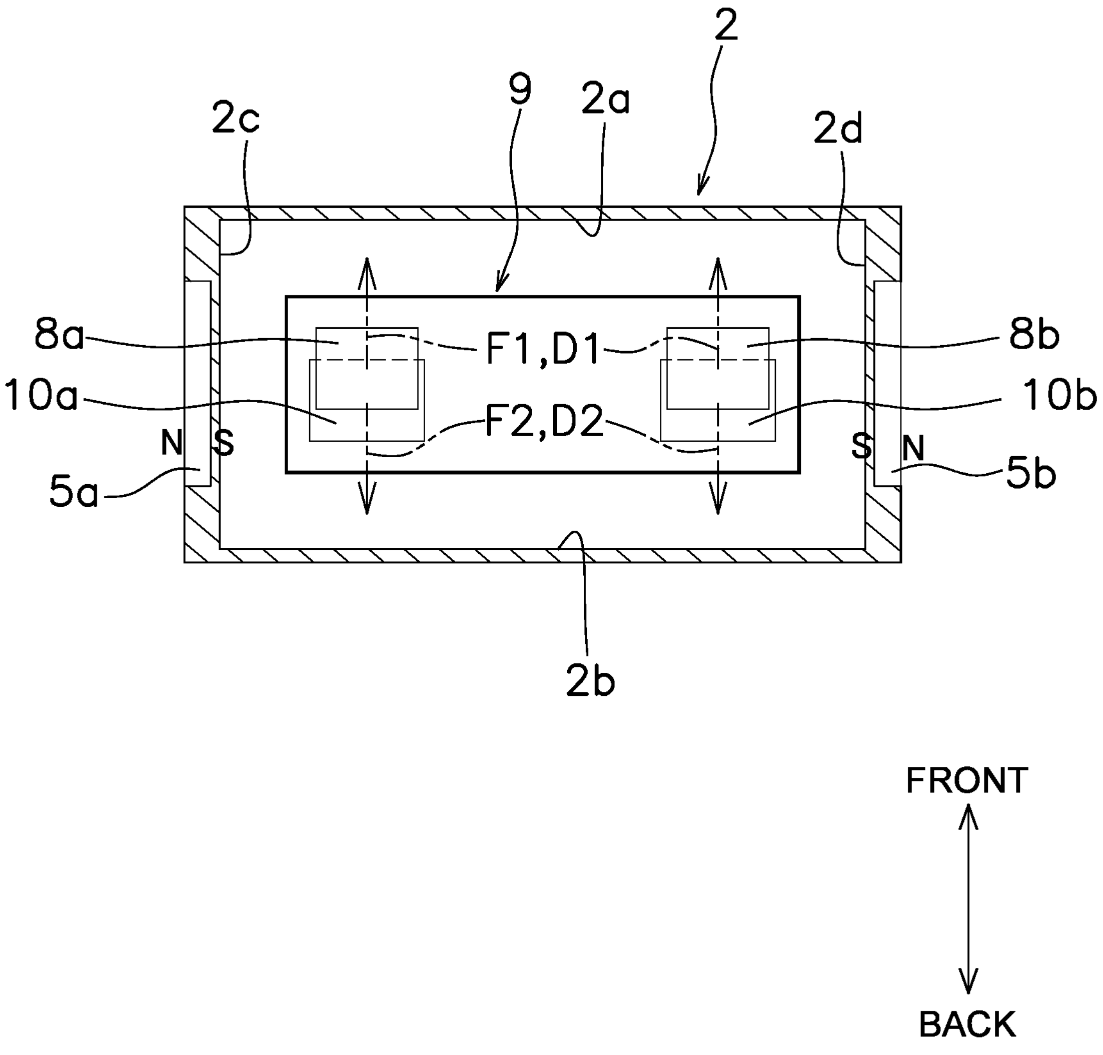
FIG. 9 is a schematic view of the inside of a contact case according to another embodiment, viewed from above.

As shown in FIG. 9, the first magnet 5*a* and the second magnet 5*b* may be disposed such that their south poles face each other in the longitudinal direction of the movable contact piece 9. That is, the magnet unit 5 may be configured such that magnetic flux flows around the fixed contact 8*a* and the movable contact 10*a* in the direction from the second magnet 5*b* toward the first magnet 5*a* and also magnetic flux flows around the fixed contact 8*b* and the movable contact 10*b* in the direction from the first magnet 5*a* toward the second magnet 5*b*. The fixed contacts 8*a* and 8*b* and the movable contacts 10*a* and 10*b* have the same configurations as those of the fixed contact 8*b* and the movable contact 10*b* shown in FIG. 6.

Figure 10:
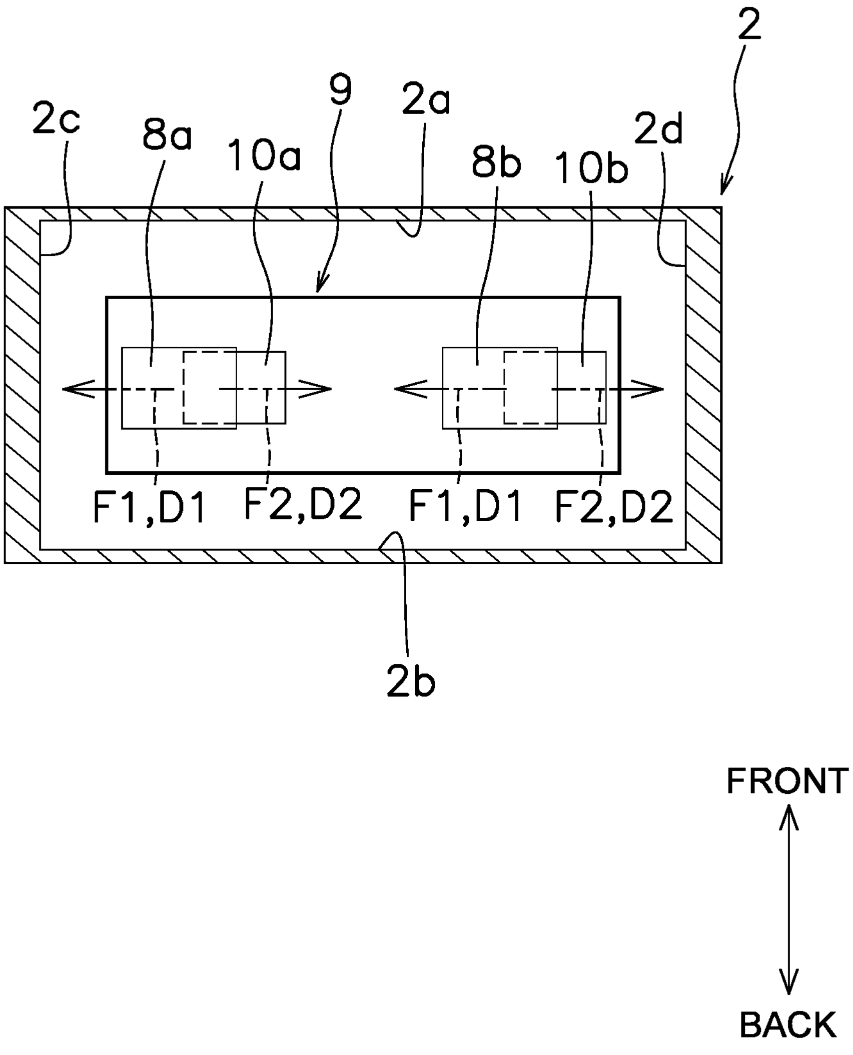
FIG. 10 is a schematic diagram of the inside of a contact case according to another embodiment, viewed from above.

As shown in FIG. 10, the magnet unit 5 may be configured such that magnetic flux flows in a direction substantially parallel to the lateral direction of the movable contact piece 9. For example, the first magnet 5*a* and the second magnet 5*b* may be disposed to face each other in the lateral direction of the movable contact piece 9. Further, in the case where the relay has a polar structure, or in the case where the magnetic flux flows in the direction from the second inner surface 2*b* toward the first inner surface 2*a*, as shown in FIG. 10, the fixed contacts 8*a*, 8*b* and the movable contacts 10*a*, 10*b* may be disposed to be out of alignment in the direction of arc extension (here, in the left-right direction). In this case, the directions in which the Lorentz forces F1 and F2 act are parallel to the longitudinal direction of the movable contact piece 9. When a current flows from the movable contact 10*a* toward the fixed contact 8*a*, the Lorentz force F1 acts, in the direction toward the third inner surface 2*c*, onto the arc that occurs between the fixed contact 8*a* and the movable contact 10*a*. In contrast, when a current flows in the direction from the fixed contact 8*a* toward the movable contact 10*a*, the Lorentz force F2 acts, in the direction toward the fourth inner surface 2*d*, onto the arc that occurs between the fixed contact 8*b* and the movable contact 10*b*. In this case, also, the anode-side contact is invariably shorter than the cathode-side contact in the direction of arc extension, and thereby the end of the arc can be quickly transferred.

REFERENCE NUMERALS

5 Magnet unit
6 Fixed terminal
7 Movable contact piece
8*a* Fixed contact
10*a* Movable contact
11 Movable mechanism
100 Electromagnetic relay
D1 First direction
D2 Second direction

The invention claimed is:

1. An electromagnetic relay comprising:

a fixed terminal;

a movable contact piece;

a first contact disposed on one of the fixed terminal or the movable contact piece;

a second contact configured to contact the first contact and disposed on another of the fixed terminal or the movable contact piece;

a movable mechanism configured to move the movable contact piece between a closed position where the first contact is in contact with the second contact and an open position where the first contact is separated from the second contact; and a magnet unit configured to generate a magnetic field to apply a Lorentz force to an arc generated between the first contact and the second contact, wherein the magnet unit applies the Lorentz force in a first direction to the arc when a current flowing through the arc is directed from the second contact toward the first contact, one of the first contact or the second contact protrudes in the first direction with respect to another of the first contact or the second contact, and in a state in which the first contact is in contact with the second contact, a center position of the first contact and a center position of the second contact are shifted from each other in the first direction.

2. The electromagnetic relay according to claim 1, wherein the first contact protrudes in the first direction with respect to the second contact.

3. The electromagnetic relay according to claim 2, wherein the second contact protrudes in a second direction opposite to the first direction with respect to the first contact, and the magnet unit applies the Lorentz force in the second direction to the arc when a current flowing through the arc is directed from the first contact toward the second contact.

4. The electromagnetic relay according to claim 1, wherein in a state in which the first contact is separated from the second contact, the center position of the first contact and the center position of the second contact are shifted from each other in the first direction.

* * * * *